United States Patent
Aoyanagi et al.

(10) Patent No.: US 8,107,538 B2
(45) Date of Patent: Jan. 31, 2012

(54) MOVING IMAGE DISTRIBUTION SYSTEM AND MOVING IMAGE DISTRIBUTION SERVER

(75) Inventors: Hisakazu Aoyanagi, Tokyo (JP); Tomohiro Mihara, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 1643 days.

(21) Appl. No.: 11/445,162

(22) Filed: Jun. 2, 2006

(65) Prior Publication Data

US 2007/0040818 A1  Feb. 22, 2007

(30) Foreign Application Priority Data

Aug. 19, 2005  (JP) ................. 2005-238606

(51) Int. Cl.
*H04N 7/18* (2006.01)
(52) U.S. Cl. .......... 375/240.25; 375/240.26; 375/240.28
(58) Field of Classification Search . 375/240.01–240.29
See application file for complete search history.

(56) References Cited

U.S. PATENT DOCUMENTS

| 7,131,048 B2 * | 10/2006 | Suzuki et al. ................. 714/748 |
| 2003/0028537 A1 | 2/2003 | Nakamura et al. |
| 2004/0010727 A1 | 1/2004 | Fujinami |

FOREIGN PATENT DOCUMENTS

| CN | 1471769 A | 1/2004 |
| JP | 10-56479 | 2/1998 |
| JP | 10-126771 A | 5/1998 |
| JP | 11-275519 | 10/1999 |
| JP | 2002-354419 | 12/2002 |
| JP | 2003-37585 A | 2/2003 |
| JP | 2003-46977 A | 2/2003 |
| JP | 2003-204492 A | 7/2003 |
| JP | 2004-193868 A | 7/2004 |
| JP | 2004-282667 A | 10/2004 |
| WO | 03/010915 A1 | 2/2003 |

OTHER PUBLICATIONS

Japanese Office Action dated Feb. 25, 2009 with Partial English-Language Translation.
Chinese Office Action dated Apr. 10, 2009.

* cited by examiner

*Primary Examiner* — Andy Rao
(74) *Attorney, Agent, or Firm* — McGinn Intellectual Property Law Group, PLLC

(57) ABSTRACT

A moving image distribution system is capable of making phase adjustment of video data and audio data while preventing the cost of a display apparatus from increasing, by adjusting time information with a moving image distribution server. The moving image distribution server stores moving image data, reads the moving image data, changes information included therein as to decoding times or reproducing times of video data or audio data included in the moving image data based on a predetermined phase adjustment variable, and then distributes the moving image data. A reproducing apparatus receives the moving image data distributed from the moving image distribution server, decodes the moving image data according to the information included therein as to the decoding times and the reproducing times, and reproduces the moving image data.

17 Claims, 9 Drawing Sheets

MOVING IMAGE DISTRIBUTION SYSTEM AND MOVING IMAGE DISTRIBUTION SERVER

BACKGROUND OF THE INVENTION

1. Field of the Invention

The present invention relates to a system for distributing moving image data through a network, and more particularly to a moving image distribution system which is capable of making phase adjustment of video data and audio data.

2. Description of the Related Art

In recent years, the distribution of moving image data through a network has been growing. Display apparatus such as projectors can be connected to a moving image distribution server through a network for receiving moving image data distributed from the moving image distribution server. A display apparatus reproduces video and audio data from the moving image distribution server based on a system clock signal, as disclosed in JP-A No. 11-275519.

Display apparatus process various video signals such as composite signals, RGB signals, etc. to display images represented by those video signals. Video signal processing schemes include an I/P conversion process for converting an interlaced video signal into a progressive video signal and a process for converting the resolution of a video signal to a value that matches the display apparatus.

However, the video signal processing processes are problematic in that they produce a delay in the display of video data and the delay shifts the image out of phase with the corresponding audio data by several fields, causing the viewer to feel odd about the asynchronous display. In order to solve the problem, it is necessary to delay the audio data with a delay circuit for bringing the video data and the audio data into phase with each other.

According to the above moving image distribution system, however, the cost of the display apparatus increases due to the addition of the delay circuit for delaying the sound in order to bring the video data and the audio data into phase with each other.

SUMMARY OF THE INVENTION

It is an object of the present invention to provide a moving image distribution system which is capable of making phase adjustment of video data and audio data while preventing the cost of a display apparatus from increasing.

To achieve the above object, there is provided a moving image distribution system for distributing moving image data including video data and audio data and capable of prescribing decoding times and reproducing times for the video data and the audio data. The moving image distribution system comprises a moving image distribution server and a reproducing apparatus. The moving image distribution server stores in advance the moving image data including information as to the decoding times and the reproducing times for the video data and the audio data, reads the moving image data, changes the information included therein as to the decoding times or the reproducing times based on a predetermined phase adjustment variable to adjust the phase relationship between the video data and the audio data, and then distributes the moving image data.

The reproducing apparatus receives the moving image data distributed from the moving image distribution server, decodes the video data and the audio data included in the moving image data according to the information as to the decoding times which is included in the moving image data, and reproduces the video data and the audio data according to the information as to the reproducing times which is included in the moving image data.

Since the moving image distribution server changes decoding times and reproducing times for video data and audio data in a stream, the reproducing apparatus may decode or reproduce the video data and audio data received from the moving image distribution server according to the changed decoding times or reproducing times. Consequently, the video data and the audio data can be adjusted into phase with each other at a low cost without the need for any special arrangement in the reproducing apparatus for adjusting the phase of the video data and the audio data.

The above and other objects, features, and advantages of the present invention will become apparent from the following description with reference to the accompanying drawings which illustrate examples of the present invention.

DETAILED DESCRIPTION OF THE PREFERRED EMBODIMENTS

Preferred embodiments of the present invention will be described in detail below with reference to the drawings.

Figure 1:
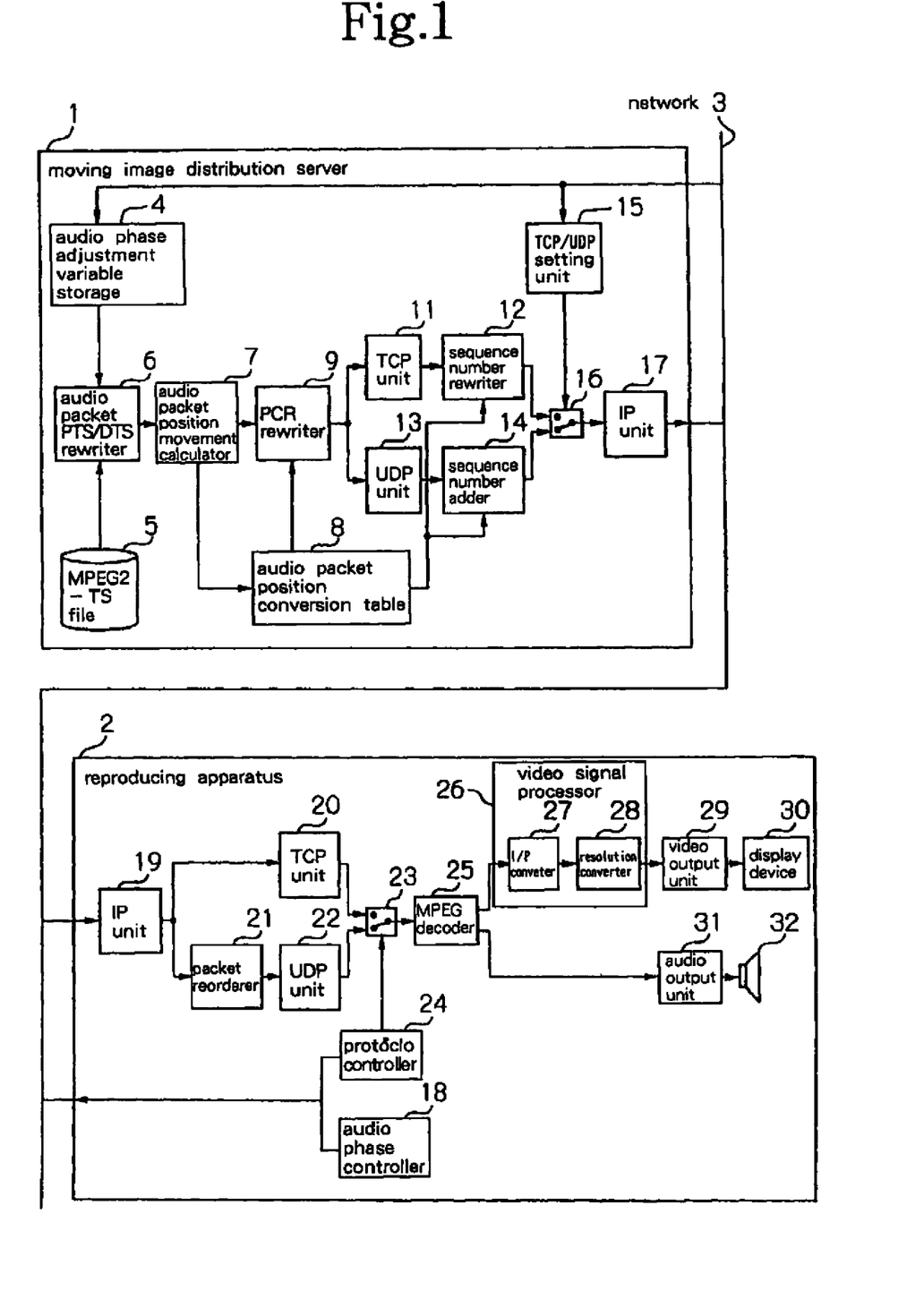
FIG. 1 is a block diagram of a moving image distribution system according to a first embodiment of the present invention.

FIG. 1 shows in block form a moving image distribution system according to a first embodiment of the present invention. According to the first embodiment, the moving image distribution system distributes moving image data as an MPEG2-TS (MPEG2 Transport Stream) stream. As shown in FIG. 1, the moving image distribution system according to the first embodiment generally comprises moving image distribution server 1 and reproducing apparatus 2 which are interconnected through network 3. Moving image distribution server 1 is a server for distributing moving image data including video data and audio data. Reproducing apparatus 2 is an apparatus for receiving moving image data from moving image distribution server 1 and reproducing the video data and audio data thereof.

When an MPEG2-TS stream is generated, information representing a decoding time and a reproducing time is added to the MPEG2-TS stream. Generally, such information does not take account all video data delays that are caused by signal processing processes performed by various reproducing apparatus such as projectors, etc. Therefore, moving image distribution server 1 distributes an MPEG2-TS stream whose audio data have been delayed by a phase adjustment variable indicated by reproducing apparatus 2 to reproducing apparatus 2. When reproducing apparatus 2 reproduces such a distributed MPEG2-TS stream, the video data and the audio data thereof are reproduced in phase with each other.

Figure 2:
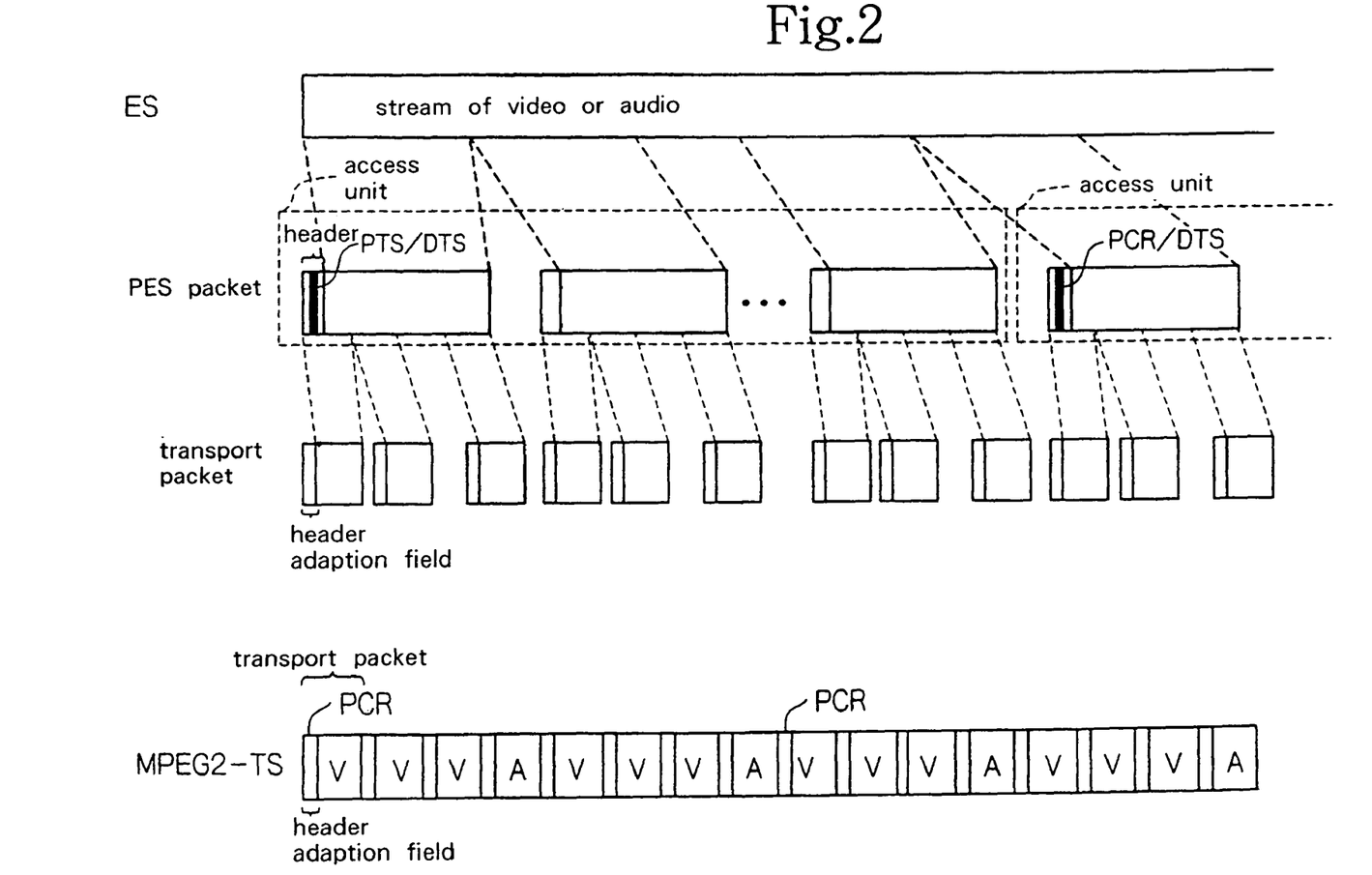
FIG. 2 is a diagram illustrating an MPEG2-TS stream distributed from a moving image distribution server to a reproducing apparatus.

FIG. 2 illustrates an MPEG2-TS stream distributed from a moving image distribution server to a reproducing apparatus. As shown FIG. 2, the MPEG2-TS stream includes an ES (Elementary Stream) representing MPEG-encoded video data and an ES representing MPEG-encoded audio data. Each of the ESs is packetized into variable-length PES (Packetized Elementary Stream) packets, and each of the PES packets is divided into fixed-length transport packets. The transport packets are multiplexed into the MPEG2-TS stream.

An access unit, which serves as a unit to be decoded and reproduced, is made up of a plurality of PES packets. The leading PES packet of the access unit has a header to which there are added a DTS (Decoding Time Stamp) representing a decoding time for the access unit and a PTS (Presentation Time Stamp) representing a reproducing time for the access unit. Some of the transport packets have a header followed by an adaption field to which there is added a PCR (Program Clock Reference) representing a time to arrive at a decoder. In the MPEG2-TS stream shown in FIG. 2, video transport packets are represented by "V" and audio transport packets by "A".

Moving image distribution server 1 rewrites a PTS or a DTS added to audio PES packets in the moving image data depending on a phase adjustment variable for audio data phase adjustment. Since the PTS or the DTS is rewritten to delay the time to decode the audio data or the time to reproduce the audio data by the phase adjustment variable in reproducing apparatus 2, reproducing apparatus 2 reproduces the video data and the audio data in phase with each other.

The buffer size of an MPEG decoder is determined according to the MPEG standards, and MPEG2-TS streams are configured according to the MPEG standards. If the decoder of reproducing apparatus 2 is constructed according to the MPEG standards, then it is not expected for audio PES packets to be distributed earlier than the decoding time or the reproducing time, and the buffer of the decoder may overflow due to the earlier distribution of audio PES packets. To avoid such a drawback, it is necessary to add, to reproducing apparatus 2, a buffer for holding audio PES packets received from moving image distribution server 1 until the decoding time or the reproducing time. Reproducing apparatus 2 with such an additional buffer has its cost increased. According to the present embodiment, moving image distribution server 1 moves the position of audio transport packets in the MPEG2-TS stream. The position of audio transport packets is moved by rewriting sequence numbers, as described later. If there is no possibility for the buffer of the decoder to overflow, then the position of audio transport packets does not need to be moved.

If PCRs are added to audio transport packets that are to be moved, then moving image distribution server 1 corrects the PCRs for times corresponding to the intervals that the audio transport packets are to be moved.

Figure 3:
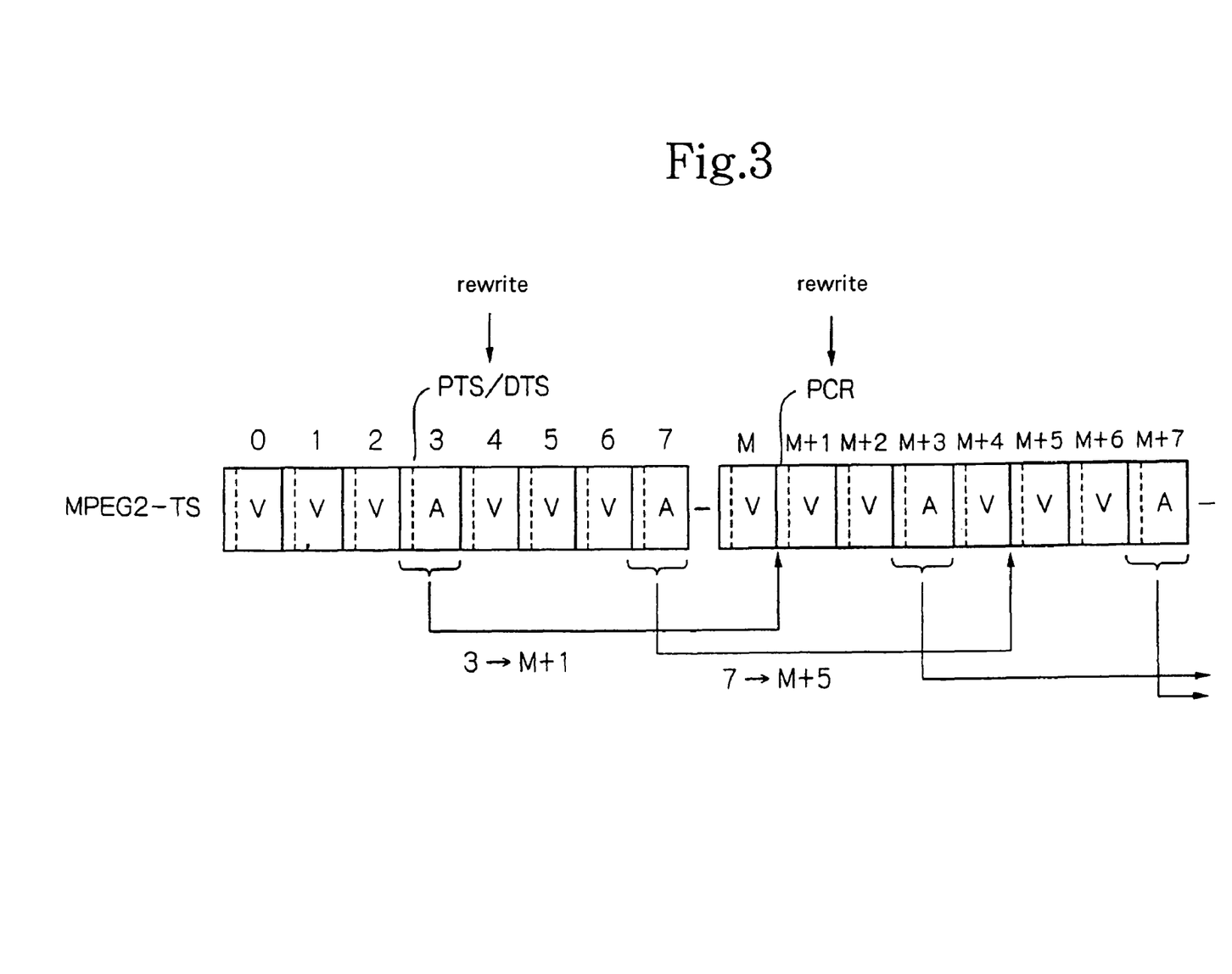
FIG. 3 is a diagram illustrating by way of example the manner in which an MPEG2-TS stream is converted by the moving image distribution server.

FIG. 3 illustrates by way of example the manner in which an MPEG2-TS stream is converted by moving image distribution server 1. As shown in FIG. 3, the MPEG2-TS stream contains a plurality of transport packets. In FIG. 3, video transport packets are represented by "V" and audio transport packets by "A". Audio transport packets are located at positions indicated by "3", "7", "M+3", "M+7", and video transport packets are located at other positions. A PCR is added to the video transport packet at position "M+1".

It is assumed that the audio transport packet at position "3" is to be moved to position "M+1", and the audio transport packet at position "7" is to be moved to position "M+5".

The audio transport packet at position "3" contains a PTS and a DTS added to the leading PES packet of the access unit. Moving image distribution server 1 rewrites the PTS or the DTS contained in the transport packet at position "3" into a PTS or a DTS depending on position "M+1".

If the transport packet that has been located in position "M+1" is moved because of the movement of the transport packet from position "3", then moving image distribution server 1 corrects the PCR of the transport packet that has been located in position "M+1" to a PCR depending on the position to which it is moved.

Reproducing apparatus 2 sets the time indicated by the PCR added to a transport packet to the STC (System Time Clock), and counts pulses of the STC according to a reference clock whose frequency has been adjusted by a PLL. When the time indicated by the STC and the decoding time indicated by the DTS are equal to each other, reproducing apparatus 2 decodes the access unit. When the time indicated by the STC and the reproducing time indicated by the PTS, reproducing apparatus 2 reproduces the access unit that has been decoded.

Moving image data are distributed from moving image distribution server 1 to reproducing apparatus 2 according to the TCP/IP protocol or the UDP/IP protocol.

A process of moving the position of transport packets according to the TCP/IP protocol will first be described below.

Moving image distribution server 1 converts an MPEG2-TS stream to be distributed to reproducing apparatus 2 into TCP packets, then converts the TCP packets into IP packets, and transmits the IP packets.

Figure 4:
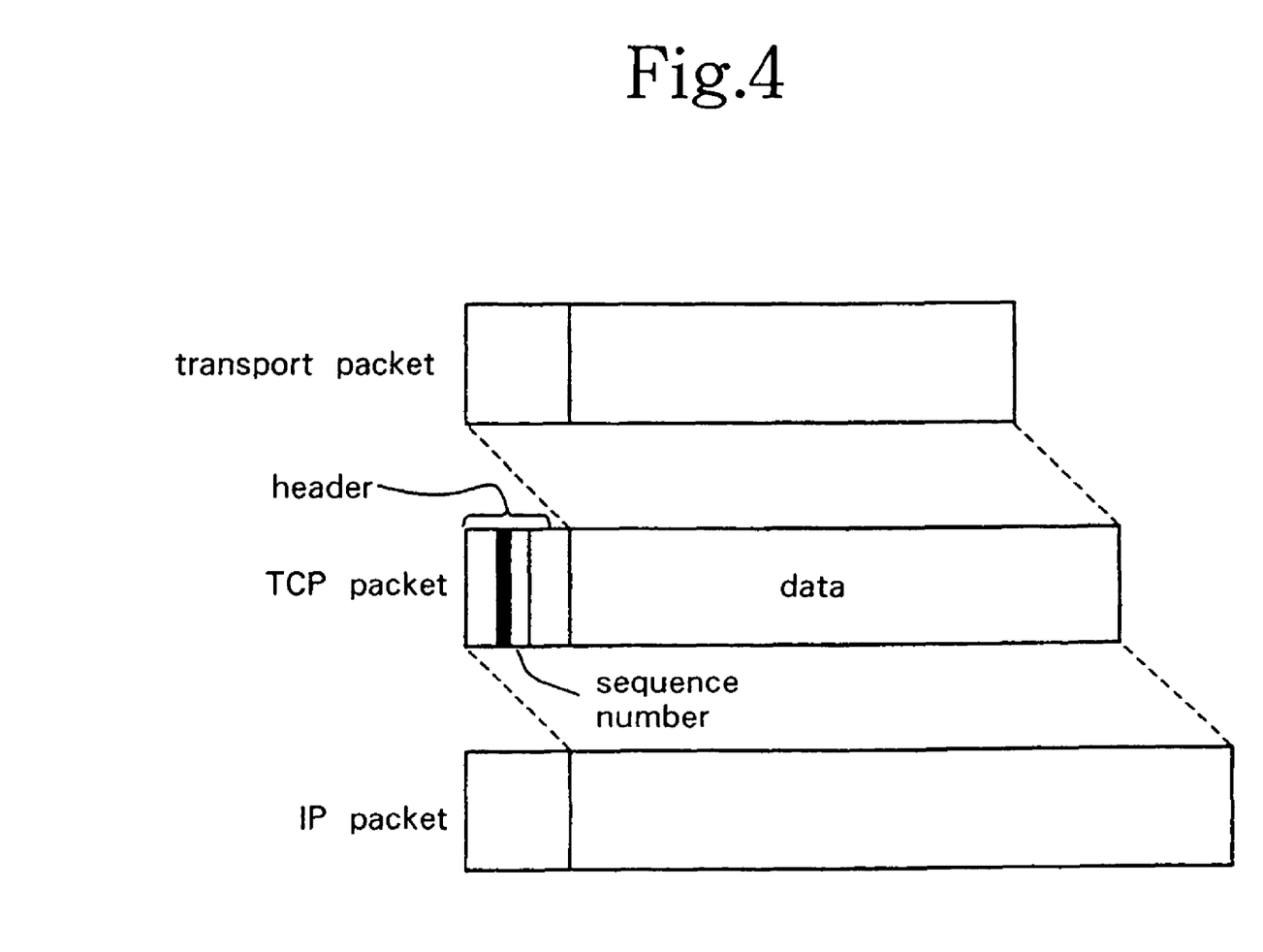
FIG. 4 is a diagram illustrating a TCP/IP packetization process.

FIG. 4 shows a TCP/IP packetization process. As shown in FIG. 4, a TCP packet comprises a header and data. Moving image distribution server 1 sets the data length of the TCP packet to a size which is the same as the length of a transport packet, and stores one transport packet in one TCP packet. Moving image distribution server 1 then converts the TCP packet into an IP packet.

The header of the TCP packet contains a sequence number. The initial value of the sequence number is determined by a random number. The sequence number of a subsequent TCP packet is represented by a value which is the sum of the sequence number of a preceding TCP packet and the data length (in octet) of the preceding TCP packet.

Figure 5:
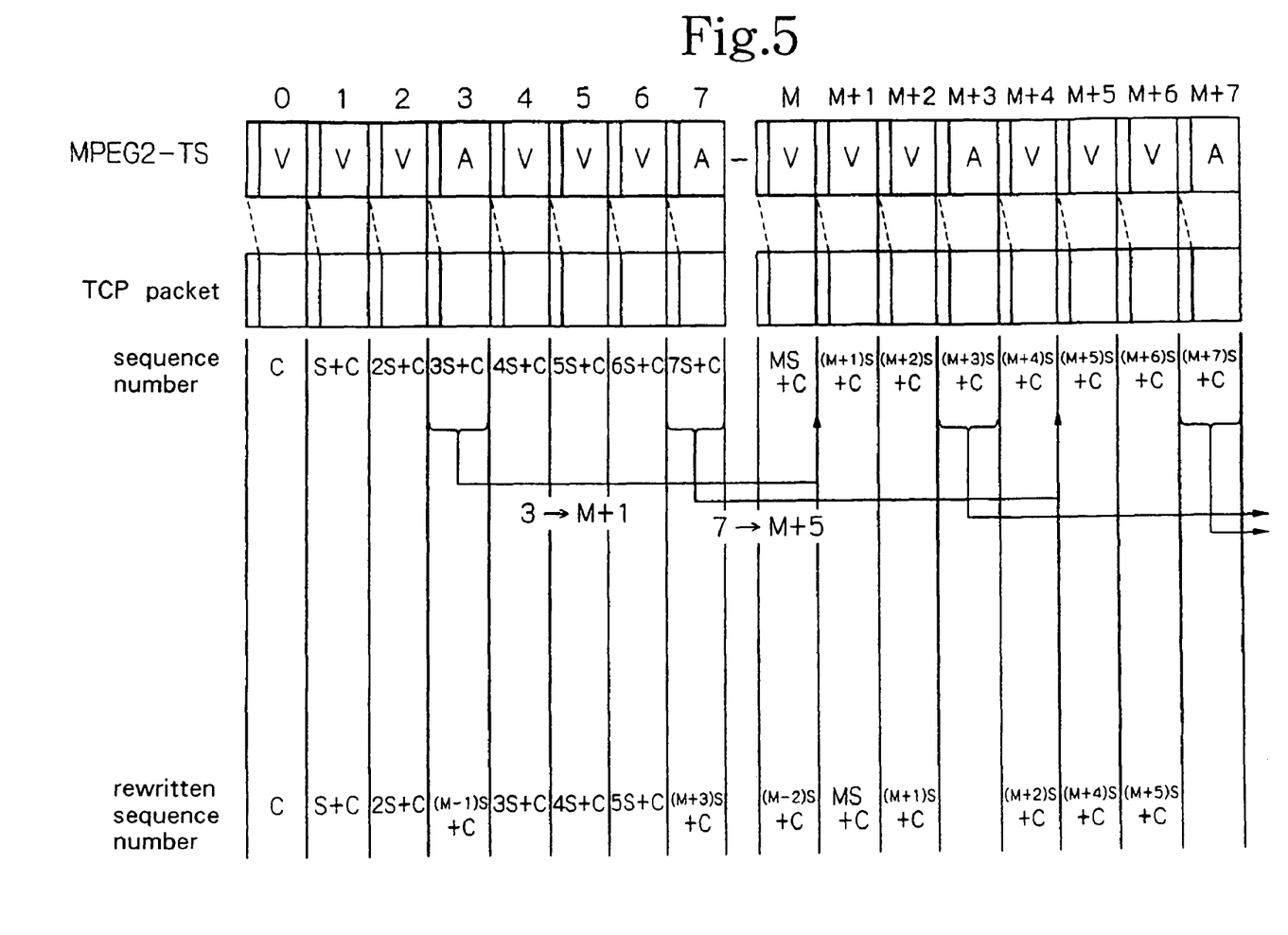
FIG. 5 is a diagram illustrating sequence numbers assigned to TCP packets by the moving image distribution server.

FIG. 5 illustrates sequence numbers assigned to TCP packets by moving image distribution server 1. In FIG. 5, an initial sequence number determined by a random number is represented by "C", and the data length of each TCP packet is represented by "S".

First, moving image distribution server 1 converts transport packets of an MPEG2-TS stream prior to being moved directly into TCP packets, and adds sequence numbers respectively to the TCP packets. Then, moving image distribution server 1 rewrites the sequence numbers of the TCP packets depending on the movement of the position of transport packets.

As shown in FIG. 5, moving image distribution server 1 assigns a sequence number "C" to a TCP packet storing a transport packet at position "0". Similarly, moving image distribution server 1 assign sequence numbers "S+C", "2S+C", "3S+C", ..., "(M+7)S+C" successively to subsequent TCP packets, respectively.

It is assumed that transport packets are to be moved as shown in FIG. 3. Moving image distribution server 1 rewrites the sequence number "3S+C" of the TCP packet storing the transport packet at position "3" into a sequence number "(M+1)S+C" because the transport packet is moved from position "3" to position "M+1". Similarly, moving image distribution server 1 rewrites the sequence numbers of subsequent TCP packets into sequence numbers depending on the positions to which they are moved.

Reproducing apparatus 2 reorders the TCP packets received from moving image distribution server 1 into a sequence of TCP packets whose sequence numbers are in an ascending order according to the TCP protocol, thus reconstructing an MPEG2-TS stream. Since the reconstructed MPEG2-TS stream includes audio transport packets that have been positionally moved, the buffer of the MPEG decoder does not suffer a failure in decoding or reproducing the audio data at times represented by the rewritten DTSs or PTSs.

A process of moving the position of transport packets according to the UDP/IP protocol will then be described below.

Moving image distribution server 1 converts an MPEG2-TS stream to be distributed to reproducing apparatus 2 into UDP packets, then converts the UDP packets into IP packets, and transmits the IP packets.

Figure 6:
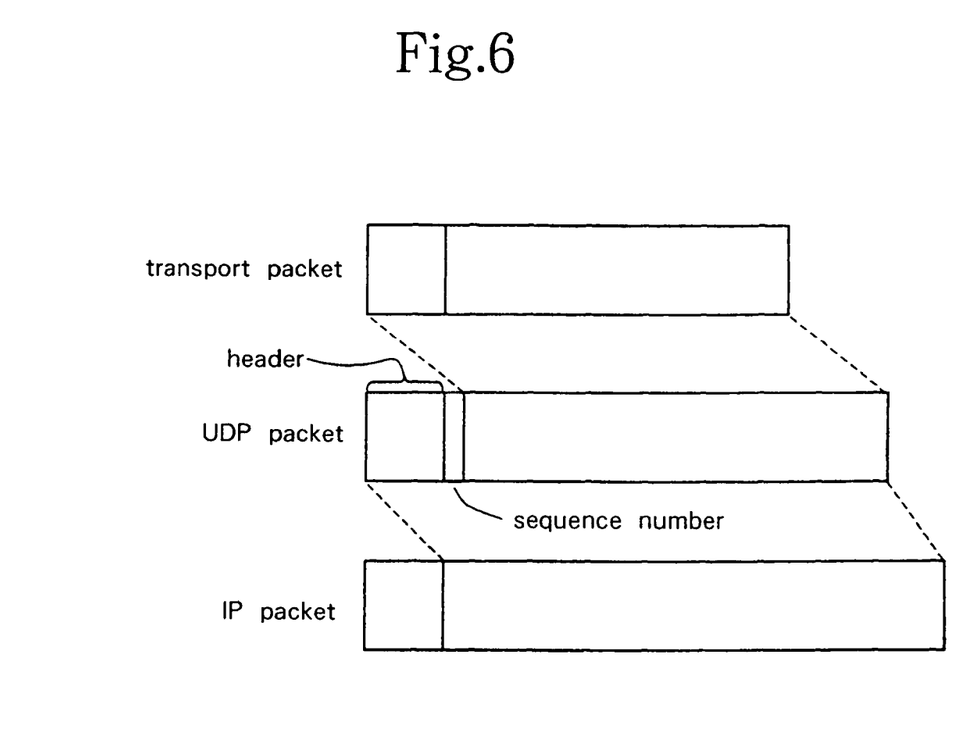
FIG. 6 is a diagram illustrating a UDP/IP packetization process.

FIG. 6 shows a UDP/IP packetization process. As shown in FIG. 6, a UDP packet comprises a header and data. As with the TCP packet, moving image distribution server 1 sets the data length of the UDP packet to a size which is the same as the length of a transport packet, and stores one transport packet in one UDP packet. Moving image distribution server 1 then converts the UDP packet into an IP packet.

Unlike the TCP packet, a UDP header does not contain a sequence number. Moving image distribution server 1 adds a sequence number to the data of the UDP packet. The sequence number may be added in the same manner as described above with reference to FIG. 5.

Reproducing apparatus 2 reorders the UDP packets received from moving image distribution server 1 into a sequence of UDP packets whose sequence numbers are in an ascending order, thus reconstructing an MPEG2-TS stream. Since the reconstructed MPEG2-TS stream includes audio transport packets that have been positionally moved, the buffer of the MPEG decoder does not suffer a failure in decoding or reproducing the audio data at times represented by the rewritten DTSs or PTSs.

Referring back to FIG. 1, moving image distribution server 1 comprises audio phase adjustment variable storage unit 4, MPEG2-TS file 5, audio packet PTS/DTS rewriter 6, audio packet position movement calculator 7, audio packet position conversion table 8, PCR rewriter 9, TCP unit 11, sequence number rewriter 12, UDP unit 13, sequence number adder 14, TCP/UDP setting unit 15, TCP/UDP switcher 16, and IP unit 17. Reproducing apparatus 2 comprises audio phase controller 18, IP unit 19, TCP unit 20, packet reorderer 21, UDP unit 22, TCP/UDP switcher 23, protocol controller 24, MPEG decoder 25, video signal processor 26, video output unit 29, display device 30, audio output unit 31, and speaker 32. Video signal processor 26 has IP converter 27 and resolution converter 28.

In moving image distribution server 1, audio phase adjustment variable storage unit 4 stores an audio phase adjustment variable for adjusting the phase of audio data. Audio phase adjustment variable storage unit 4 is notified of the audio phase adjustment variable from reproducing apparatus 2.

MPEG2-TS file 5 stores moving image data to be distributed to reproducing apparatus 2. The moving image data are in the form of an MPEG2-TS stream.

Audio packet PTS/DTS rewriter 6 rewrites PTSs or DTSs added to audio PES packets in the moving image data stored in MPEG2-TS file 5 depending on the audio phase adjustment variable stored in audio phase adjustment variable storage unit 4, and sends the file to audio packet position movement calculator 7. Specifically, audio packet PTS/DTS rewriter 6 rewrites the PTSs or the DTSs by adding the audio phase adjustment variable to the PTSs or the DTSs.

Figure 7:
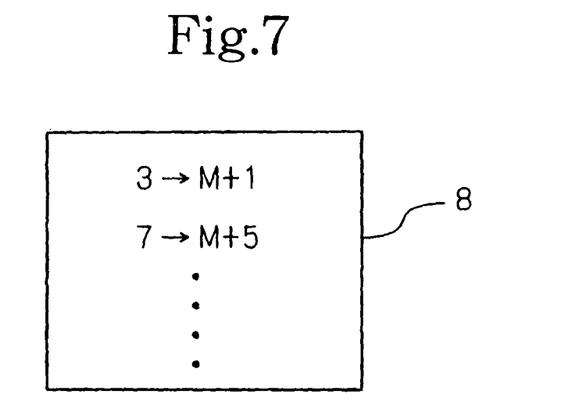
FIG. 7 is a diagram showing by way of example data recorded in an audio packet position conversion table.

Audio packet position movement calculator 7 calculates distances that audio transport packets, with respect to which the PTSs or DTSs of the PES packets have been rewritten by audio packet PTS/DTS rewriter 6, are to be moved, records the transport packets to be moved and position movement information indicative of the positions to which the transport packets are to be moved in audio packet position conversion table 8, and sends the MPEG2-TS stream to PCR rewriter 9. FIG. 7 shows an example of data recorded in audio packet position conversion table 8. In FIG. 7, the transport packets to be moved and the positions to which the transport packets are to be moved, which are recorded audio packet position conversion table 8 by audio packet position conversion table 8, are in accordance with the example shown in FIGS. 3 and 5. As shown in FIG. 7, the position movement information recorded in audio packet position conversion table 8 indicates that the transport packet at position "3" is to be moved to position "M+1", and the audio transport packet at position "7" is to be moved to position "M+5".

PCR rewriter 9 rewrites PCRs in the MPEG2-TS stream by referring to the data recorded in audio packet position conversion table 8, and sends the MPEG2-TS stream with the rewritten PCRs to TCP unit 11 and UDP unit 13.

TCP unit 11 converts the MPEG2-TS stream from PCR rewriter 9 into TCP packets, and sends the TCP packets to sequence number rewriter 12.

Sequence number rewriter 12 rewrites the sequence numbers of TCP packets by referring to the data recorded in audio packet position conversion table 8, and sends the TCP packets to TCP/UDP switcher 16.

UDP unit 13 converts the MPEG2-TS stream from PCR rewriter 9 into UDP packets, and sends the UDP packets to sequence number adder 14.

Sequence number adder 14 rewrites adds sequence numbers to UDP packets by referring to the data recorded in audio packet position conversion table 8, and sends the UDP packets to TCP/UDP switcher 16.

TCP/UDP setting unit 15 holds setting information indicative of whether the TCP or the UDP is to be used for moving image distribution. The setting information is indicated from reproducing apparatus 2.

TCP/UDP switcher 16 selects the TCP protocol or the UDP protocol according to the setting information held by TCP/UDP setting unit 15.

IP unit 17 processes packets from TCP/UDP switcher 16 into IP packets according to the IP protocol and sends the IP packets through network 3 to reproducing apparatus 2.

In reproducing apparatus 2, audio phase controller 18 indicates a phase adjustment variable to audio phase adjustment variable storage unit 4 of moving image distribution server 1.

IP unit 19 processes IP packets sent from moving image distribution server 1 according to the IP protocol.

If the TCP/IP protocol is used for moving image distribution, then TCP unit 20 processes TCP packets from IP unit 19 to reconstruct an MPEG2-TS stream, and sends the reconstructed MPEG2-TS stream to TCP/UDP switcher 23. At this time, TCP unit 20 reorders the TCP packets into a sequence of TCP packets whose sequence numbers are in an ascending order.

If the UDP/IP protocol is used for moving image distribution, then packet reorderer 21 reorders UDP packets from IP unit 19 according to the sequence numbers, and sends the reordered UDP packets to UDP unit 22.

UDP unit 22 processes the UDP packets from packet reorderer 21 according to the UDP protocol to reconstruct an MPEG2-TS stream, and sends the reconstructed MPEG2-TS stream to TCP/UDP switcher 23.

TCP/UDP switcher 23 selects the TCP protocol or the UDP protocol according to an instruction from protocol controller 24.

Protocol controller 24 makes a setting as to whether the TCP protocol or the UDP protocol is to be used for moving image distribution, instructs TCP/UDP switcher 23 based on the setting, and sends the setting to TCP/UDP setting unit 15 of moving image distribution server 1.

MPEG decoder 25 decodes the moving image data of the MPEG stream from moving image distribution server 1, sends a video signal to video signal processor 26, and sends an audio signal to audio output unit 31.

Video signal processor 26 processes the video signal from MPEG decoder 25 and sends the processed video signal to video output unit 29.

If the video signal from MPEG decoder 25 is an interlaced signal, then I/P converter 27 of video signal processor 26 converts the video signal into a progressive signal, and sends the progressive signal to resolution converter 28.

Resolution converter 28 of video signal processor 26 converts the resolution of the video signal from I/P converter 27 to a value that matches display device 30, and sends the resolution-converted video signal to video output unit 29.

Video output unit 29 outputs the video signal from video signal processor 26 to display device 30.

Display device 30 displays an image according to the video signal from video output unit 29.

Audio output unit 31 outputs the audio signal from MPEG decoder 25 to speaker 32.

Speaker 32 generates a sound according to the audio signal from audio output unit 31.

According to the present embodiment, as described above, moving image distribution server 1 changes information as to a decoding time or a reproducing time in moving image data in order to bring moving image data and audio data into phase with each other. Reproducing apparatus 2 decodes or reproduces video data and audio data of packets received from moving image distribution server 1 according to the information changed by moving image distribution server 1. Since reproducing apparatus 2 can easily make phase adjustment by decoding or reproducing video data and audio data in the same manner as with conventional reproducing apparatus, the cost of reproducing apparatus 2 is prevented from increasing due to a phase adjustment function.

According to the present embodiment, furthermore, moving image distribution server 1 changes the positions of packets in a stream according to changed decoding times or reproducing times, thereby correcting times for the packets to arrive at MPEG decoder 25 of reproducing apparatus 2. Therefore, the moving image distribution system is capable of making phase adjustment of video and audio data at a low cost without the need for a buffer for phase adjustment.

According to the present embodiment, furthermore, if the TCP/IP protocol is used for moving image distribution, then in moving image distribution server 1, sequence number rewriter 12 rewrites the sequence numbers of TCP headers in order to move audio packets to positions according to DTSs or PTSs. In reproducing apparatus 2, therefore, TCP unit 20 reorders the packets received from moving image distribution server 1 according to the sequence numbers through the ordinary TCP process, thereby adjusting the times for the packets to arrive at MPEG decoder 25. As a result, the buffer of MPEG decoder 25 does not suffer a failure and there is no need for the addition of a buffer to MPEG decoder 25 for moving the positions of packets.

According to the present embodiment, furthermore, if the UDP/IP protocol is used for moving image distribution, then in moving image distribution server 1, sequence number adder 14 adds sequence numbers to the data of UDP packets in order to move audio packets to positions according to DTSs or PTSs. In reproducing apparatus. 2, packet reorderer 21 reorders the packets received from moving image distribution server 1 according to the sequence numbers. Consequently, even if the UDP/IP protocol is used, reproducing apparatus 2 can adjust the times for the packets to arrive simply by adding a process similar to the process regarding the sequence numbers according to the TCP/IP process.

According to the present embodiment, furthermore, in moving image distribution server 1, PCR rewriter 9 rewrites PCRs depending on the positions of packets including the PCRs after audio packets have been moved. Reproducing apparatus 2 decodes or reproduces packets using the STC based on the PCRs. Accordingly, the packets can be decoded and reproduced at the exact STC.

The adjustment of the phase of audio data has been described in the above embodiment. However, the present invention is not limited to the adjustment of the phase of audio data, but may be applied the adjustment of the phase of video data.

The delaying of the phase has been described as the adjustment of the phase in the above embodiment. However, the present invention is not limited to the delaying of the phase, but may be applied to the advancing of the phase. According to such a modification, the rewriting of the sequence numbers of TCP packets functions to prevent the buffer from suffering a failure due to an underflow.

A second embodiment of the present invention will be described below.

According to the second embodiment, an MPEG2-PS (MPEG2 Program Stream) is distributed.

Figure 8:
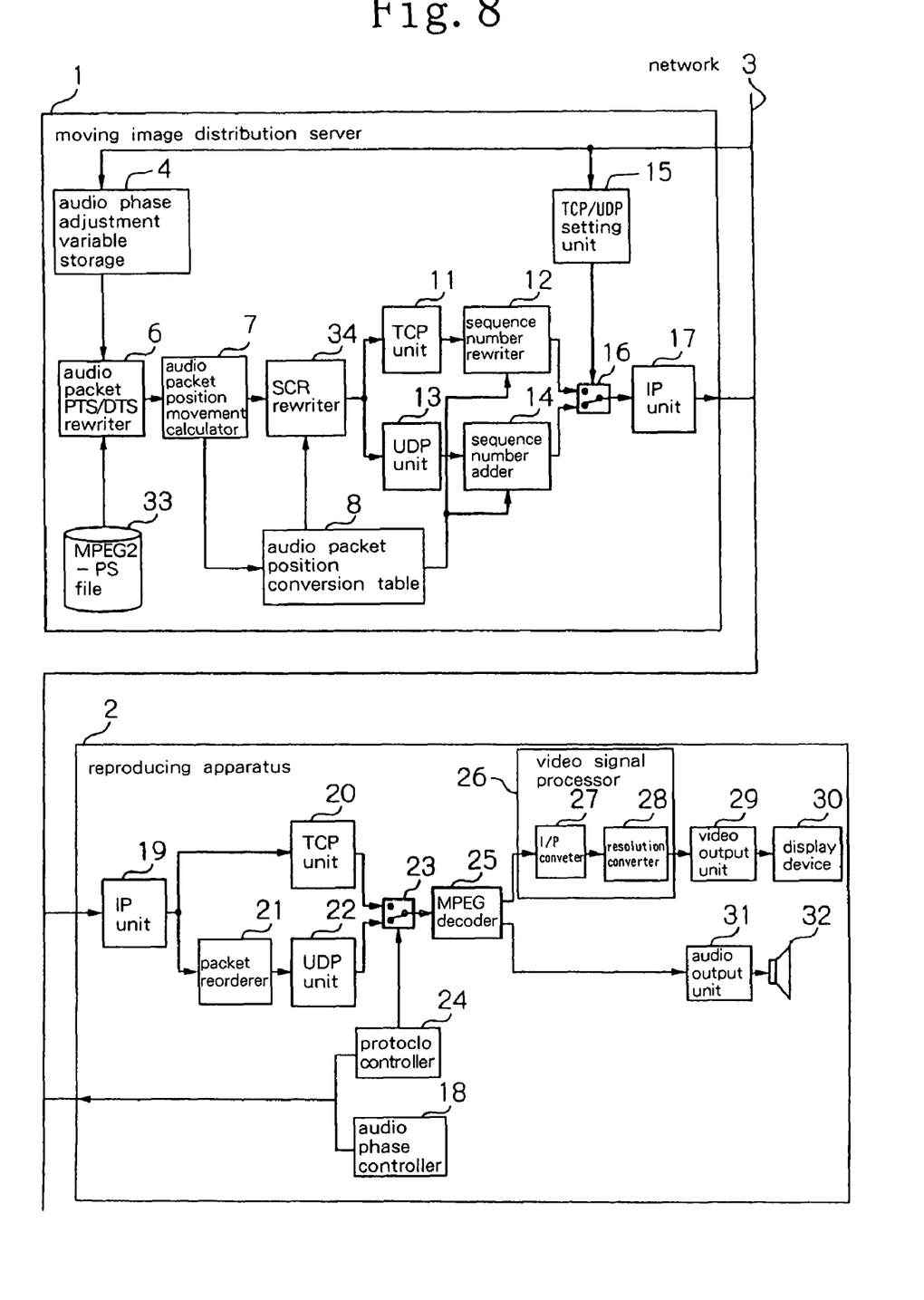
FIG. 8 is a block diagram of a moving image distribution system according to a second embodiment of the present invention.

FIG. 8 shows in block form a moving image distribution system according to the second embodiment of the present invention. As shown in FIG. 8, the moving image distribution system according to the second embodiment generally comprises moving image distribution server 1 and reproducing apparatus 2 which are interconnected through network 3. Moving image distribution server 1 is a server for distributing moving image data including video data and audio data. Reproducing apparatus 2 is an apparatus for receiving moving image data from moving image distribution server 1 and reproducing the video data and audio data thereof.

Moving image distribution server 1 distributes an MPEG2-PS stream whose audio data have been delayed a phase adjustment variable indicated by reproducing apparatus 2 to reproducing apparatus 2. When reproducing apparatus 2 reproduces such a distributed MPEG2-PS stream, the video data and the audio data thereof are reproduced in phase with each other.

Figure 9:
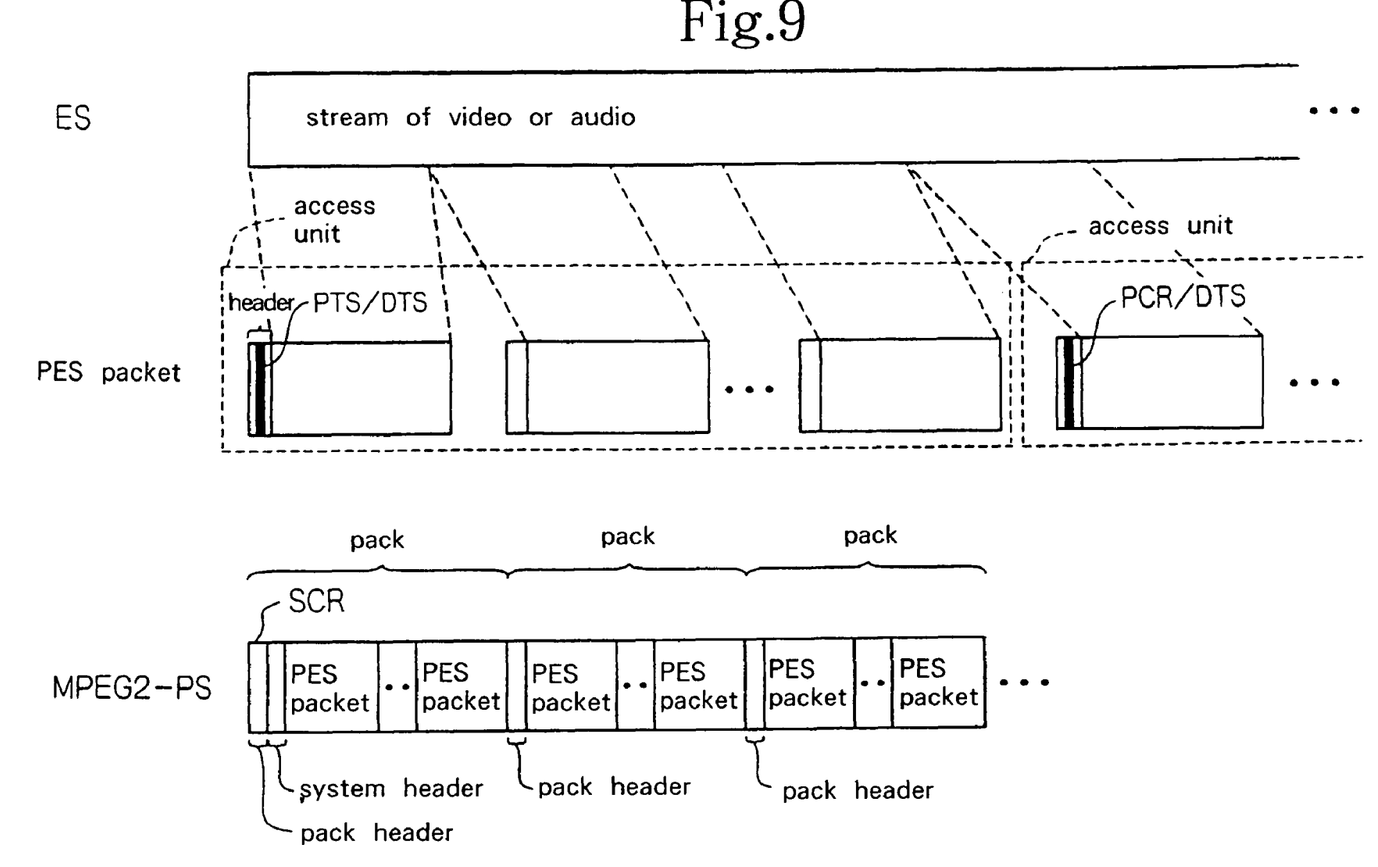
FIG. 9 is a diagram illustrating an MPEG2-PS stream distributed from a moving image distribution server to a reproducing apparatus.

FIG. 9 illustrates an MPEG2-PS stream distributed from a moving image distribution server to a reproducing apparatus. As shown FIG. 9, the MPEG2-PS stream comprises PES packets packetized from a video ES and PES packets packetized from an audio ES, the PES packets being multiplexed. The MPEG2-PS stream is made up of packs each comprising a pack header, a system header, and a plurality of PES packets. The system header is necessarily added to the first pack of the MPEG2-PS stream.

The pack header contains an SCR (System Clock Reference) indicative of an estimated time for the pack to arrive at an MPEG decoder. According to the first embodiment, moving image distribution server 1 rewrites PCRs. According to the second embodiment, however, moving image distribution server 1 rewrites SCRs of the MPEG2-PS stream. In reproducing apparatus 2 according to the second embodiment, SCRs are set in the STC, and pulses of the STC are counted according to a reference clock whose frequency has been adjusted by a PLL.

Figure 10:
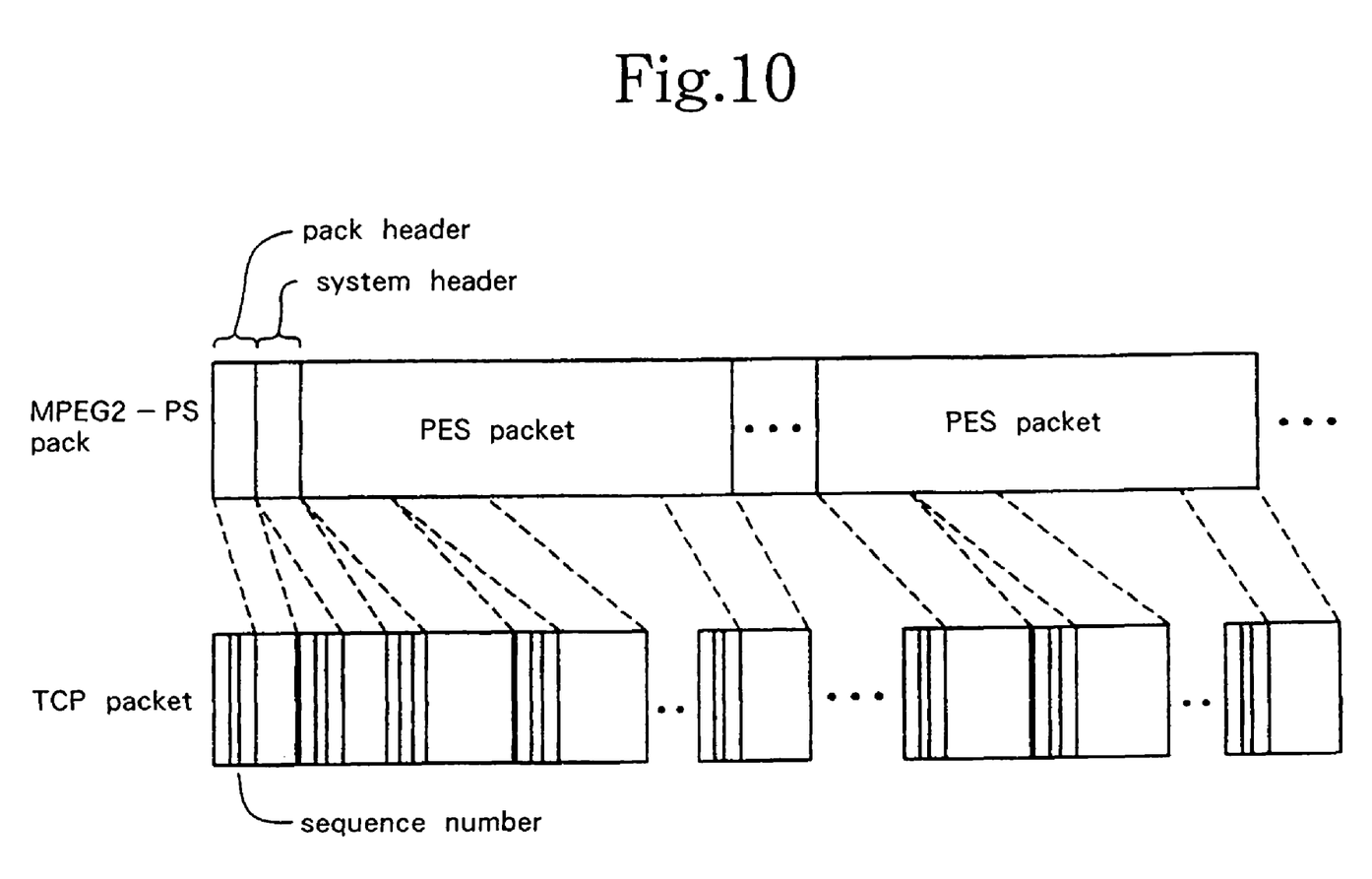
FIG. 10 is a diagram illustrating a TCP/IP packetization process.

FIG. 10 illustrates a TCP/IP packetization process. As shown in FIG. 10, if the TCP/IP protocol is used for moving image distribution, moving image distribution server 1 packetizes each of pack headers and a system header included in the packs of an MPEG2-PS stream into a TCP packet. Moving image distribution server 1 also divides and packetizes each of PES packets into a plurality of TCP packets. At this time, the data of plural PES packets are not stored in one TCP packet.

If the UDP/IP protocol is used for moving image distribution, moving image distribution server 1 packetizes each of pack headers and a system header included in the packs of an MPEG2-PS stream into a UDP packet. Moving image distribution server 1 also divides and packetizes each of PES packets into a plurality of UDP packets. At this time, the data of plural PES packets are not stored in one UDP packet.

Referring back to FIG. 8, moving image distribution server 1 comprises audio phase adjustment variable storage unit 4, MPEG2-PS file 33, audio packet PTS/DTS rewriter 6, audio packet position movement calculator 7, audio packet position conversion table 8, SCR rewriter 34, TCP unit 11, sequence number rewriter 12, UDP unit 13, sequence number adder 14, TCP/UDP setting unit 15, TCP/UDP switcher 16, and IP unit 17.

Reproducing apparatus 2 comprises audio phase controller 18, IP unit 19, TCP unit 20, packet reorderer 21, UDP unit 22, TCP/UDP switcher 23, protocol controller 24, MPEG decoder 25, video signal processor 26, video output unit 29, display device 30, audio output unit 31, and speaker 32. Video signal processor 26 has IP converter 27 and resolution converter 28.

The second embodiment differs from the first embodiment in that audio packet position movement calculator 7 calculates movement of the position of PES packets. Therefore, audio packet position conversion table 8 records therein position movement information indicative of the positions to which PES packets are to be moved.

TCP unit 11 packetizes a pack into TCP packets such that one TCP packet does not extend over a plurality of PES packets. Therefore, sequence number rewriter 12 can change the position of a PES packet by rewriting the sequence numbers of the TCP headers.

Similarly, UDP unit 13 packetizes a pack into UDP packets such that one UDP packet does not extend over a plurality of PES packets. Therefore, sequence number rewriter 14 can change the position of a PES packet by adding sequence numbers to the data of the UDP packets.

The moving image distribution system according to the second embodiment differs from the moving image distribution system according to the first embodiment in that moving image distribution server 1 has SCR rewriter 34 instead of PCR rewriter 9. SCR rewriter 34 rewrites SCRs in an MPEG2-PS stream by referring to audio packet position conversion table 8, and sends the MPEG2-PS stream to TCP unit 11 and UDP unit 13.

While preferred embodiments of the present invention have been described using specific terms, such description is for illustrative purposes only, and it is to be understood that changes and variations may be made without departing from the spirit or scope of the following claims.

What is claimed is:

1. A moving image distribution system for distributing moving image data including video data and audio data and capable of prescribing decoding times and reproducing times for the video data and the audio data, the moving image distribution system comprising:

a moving image distribution server for storing in advance the moving image data including information as to the decoding times and the reproducing times for the video data and the audio data, reading said moving image data, changing the information included therein as to the decoding times or the reproducing times based on a predetermined phase adjustment variable to adjust the phase relationship between the video data and the audio data, and then distributing the moving image data; and a reproducing apparatus for receiving the moving image data distributed from said moving image distribution server, decoding the video data and the audio data included in the moving image data according to the information as to the decoding times which is included in said moving image data, and reproducing the video data and the audio data according to the information as to the reproducing times which is included in said moving image data.

2. A moving image distribution system according to claim 1, wherein said moving image distribution server changes the position of at least one of said audio data and said video data in a stream thereof based on said phase adjustment variable thereby to bring the positional relationship between said audio data and said video data in their streams into conformity with the adjusted phase relationship between the video data and the audio data, and thereafter distributes the moving image data.

3. A moving image distribution system according to claim 2, wherein said moving image data comprise an MPEG2-TS (Moving Picture Experts Group 2-Transport Stream) stream, and said moving image distribution server changes the position of a packet of said audio data or a packet of said video data in the stream as a transport packet of said MPEG2-TS stream.

4. A moving image distribution system according to claim 3, wherein the TCP/IP (Transmission Control Protocol/Internet Protocol) protocol is used for distributing said moving image data, and said moving image distribution server packetizes one said transport packet into one TCP packet, and changes the sequence number in the header of said TCP packet according to said phase adjustment variable to change the position of said transport packet.

5. A moving image distribution system according to claim 3, wherein the UDP/IP (User Datagram Protocol/Internet Protocol) protocol is used for distributing said moving image data, and said moving image distribution server packetizes one said transport packet into one UDP packet, and adds a sequence number according to said phase adjustment variable to the data of said UDP packet to change the position of said transport packet; and wherein said reproducing apparatus reorders the UDP packet according to said sequence number added to said data.

6. A moving image distribution system according to claim 2, wherein said moving image data comprise an MPEG2-PS stream, and said moving image distribution server changes the position of a packet of said audio data or a packet of said video data in the stream as a PES packet of said MPEG2-PS (MPEG2-Program Stream) stream.

7. A moving image distribution system according to claim 6, wherein the TCP/IP protocol is used for distributing said moving image data, and said moving image distribution server packetizes a PES (Packetized Elementary Stream) packet into TCP packets such that one TCP packet does not extend over a plurality of PES packets, and changes the sequence number in the header of said TCP packet according to said phase adjustment variable to change the position of said PES packet.

8. A moving image distribution system according to claim 6, wherein the UDP/IP protocol is used for distributing said moving image data, and said moving image distribution server packetizes a PES packet into UDP packets such that one UDP packet does not extend over a plurality of PES packets, and adds a sequence number according to said phase adjustment variable to the data of said UDP packet to change the position of said PES packet; and wherein said reproducing apparatus reorders the UDP packet according to said sequence number added to said data.

9. A moving image distribution system according to claim 2, wherein when said moving image distribution server changes the position of said video data or said audio data, when the position of information as to a reference clock included in said moving image data is changed due to the changed position, then said moving image distribution server corrects the information as to the reference clock included in said moving image data depending on the change, and
wherein said reproducing apparatus reproduces said moving image data based on a reference clock generated according to the information as to the reference clock which is included in said moving image data distributed from said moving image distribution server.

10. A moving image distribution system according to claim 1, wherein said reproducing apparatus indicates a communication protocol to be used for distributing said moving image data to said moving image distribution server; and wherein said moving image distribution server distributes said moving image data to said reproducing apparatus according to said communication protocol indicated by said reproducing apparatus.

11. A moving image distribution system according to claim 9, wherein said moving image data comprise an MPEG2-TS stream, and the information as to the reference clock comprises a PCR (Program Clock Reference).

12. A moving image distribution system according to claim 9, wherein said moving image data comprise an MPEG2-PS stream, and the information as to the reference clock comprises a SCR (System Clock Reference).

13. A moving image distribution system according to claim 1, wherein said reproducing apparatus indicates said phase adjustment variable to said moving image distribution server, and
wherein said moving image distribution server uses said phase adjustment variable indicated by said reproducing apparatus.

14. A moving image distribution system according to claim 1, wherein said moving image data comprise MPEG PES packets; and wherein said moving image distribution server rewrites a DTS (Decoding Time Stamp) or a PTS (Presentation Time Stamp) in said PES packets.

15. A method of a moving image distribution system, the method comprising:
storing in advance, by a moving image distribution server, the moving image data including information as to the decoding times and the reproducing times for the video data and the audio data;
reading said moving image data and changing the information included therein as to the decoding times or the reproducing times, by the moving image distribution server, based on a predetermined phase adjustment variable to adjust the phase relationship between the video data and the audio data, and then distributing the moving image data;
receiving, by a reproducing apparatus, the moving image data distributed from said moving image distribution server;
decoding, by the reproducing apparatus, the video data and the audio data included in the moving image data according to the information as to the decoding times which is included in said moving image data; and
reproducing, by the reproducing apparatus, the video data and the audio data according to the information as to the reproducing times which is included in said moving image data.

16. The method according to claim 15, wherein the changing the information comprises changing the position of at least one of said audio data and said video data in a stream thereof based on said phase adjustment variable thereby to bring the positional relationship between said audio data and said video data in their streams into conformity with the adjusted phase relationship between the video data and the audio data.

17. The method according to claim 15, wherein said moving image distribution server changes the position of at least one of said audio data and said video data in a stream thereof based on said phase adjustment variable thereby to bring the positional relationship between said audio data and said video data in their streams into conformity with the adjusted phase relationship between the video data and the audio data, and thereafter distributes the moving image data.

* * * * *